Patented June 8, 1954

2,680,737

UNITED STATES PATENT OFFICE 2,680,737

ALKALI CELLULOSE PREPARATION

Vernon R. Grassie, Landenberg, Pa., and Calvin R. Wallis, Wilmington, Del., assignors to Hercules Powder Company, Wilmington, Del., a corporation of Delaware No Drawing. Application May 17, 1951,
Serial No. 226,931

7 Claims. (Cl. 260—233)

This invention relates to the manufacture of alkali cellulose and particularly to the manufacture of alkali cellulose suitable for the preparation of alkali-soluble and water-soluble cellulose ethers.

It is well recognized that uniform distribution of caustic alkali and water on the cellulose is a basic requirement for a good quality cellulose ether, and various methods have been proposed and utilized to prepare alkali cellulose suitable for preparation of various alkali-soluble and water-soluble cellulose ethers. Generally, the processes heretofore proposed have been found deficient in economy and/or have resulted in alkali cellulose of poor uniformity and poor quality. Prior art methods involving steeping and pressing procedures for the preparation of alkali cellulose have been wasteful because the alkali cellulose prepared in this way retains far more caustic alkali and water than is required for economic preparation of many alkali-soluble and water-soluble cellulose ethers. Various dough-mixing and dry-mixing procedures have been proposed to overcome the inherent shortcomings of steeping processes. These have not led to desired uniformity because the small amounts of caustic alkali and water required for economic preparation of alkali-soluble and water-soluble cellulose ethers cannot be uniformly distributed on the cellulose by dough-mixing or dry-mixing procedures. Slurry processes involving inert water-immiscible diluents such as benzene, ethyl ether, hexane and the like also invariably lead to products of poor uniformity and lower reagent efficiency because the caustic alkali and water cannot be uniformly distributed on the cellulose in the presence of such diluents. Moreover, slurry processes heretofore proposed have always been handicapped by the presence of matted agglomerates of cellulose fibers or particles even at very low concentrations of cellulose in the slurry, and it has not been possible to obtain a uniform distribution of caustic alkali and water on the cellulose because these matted agglomerates could not be satisfactorily dispersed.

Now in accordance with this invention a uniform alkali cellulose suitable for the preparation of various alkali-soluble and water-soluble cellulose ethers is prepared with only the required amount of caustic alkali and the required amount of water necessary for preparation of the cellulose ether. This is accomplished by forming a slurry of comminuted cellulose in a medium of the group consisting of the aliphatic alcohols having from 2 to 5 carbon atoms in the molecule, dioxane, tetrahydrofuran and mixtures thereof, said slurry containing up to about 20% by weight of said comminuted cellulose based on the combined weights of said medium and said cellulose, said comminuted cellulose having a particle size sufficiently small to pass through the openings in a 35-mesh sieve and being distributed throughout said slurry as individual particles substantially free of agglomerates; contacting the comminuted cellulose in the slurry with the required amount of caustic alkali and the required amount of water, said caustic alkali being within the range between about 0.2 and about 1.8 parts and said water being within the range between about 0.5 and about 8.0 parts for each part of cellulose by wegiht; and causing the individual particles of cellulose to move relative to each other through the slurry in the presence of the caustic alkali and the water to effect a uniform distribution of caustic alkali and water on the cellulose.

The remarkable uniformity of the alkali cellulose prepared in accordance with this invention is most surprising in view of the fact that only the required amount of water and the required amount of caustic alkali necessary for preparation of alkali-soluble and water-soluble cellulose ethers are employed in accordance with this invention.

Although it is not intended that the invention shall be limited to any particular theory of operation, it appears that the remarkably good uniformity of the alkali cellulose prepared in accordance with this invention is due to a combination of factors. In the first place, the slurrying media in accordance with this invention exhibit limited solubility for aqueous caustic alkali. This is in marked contrast to such organic media as benzene, toluene, hexane and the like in which aqueous caustic alkali is not soluble. This is also in marked contrast to organic media such as methanol in which caustic alkali is very soluble. It is believed that an equilibrium condition exists between the slurrying media of this invention and the cellulosic phase in the presence of the water and caustic alkali whereby the water and the caustic alkali are partitioned between the organic slurrying medium and the cellulosic phase, with a major part of the water and caustic alkali being distributed on the cellulosic phase due to the limited solubility of aqueous caustic alkali in the slurrying medium. In the second place, the cellulose is suspended in the slurrying medium as individual particles substantially free of agglomerates. These individual particles are caused to move relative to each other through the slurry so that individual cellulosic particles are constantly contacting and rubbing against other cellulosic particles in the presence of the water and caustic alkali. It is believed that because of the partition of the water and the caustic alkali between the organic slurrying medium and the cellulosic phase coupled with the movement of the individual cellulosic particles relative to each other through the slurry that the water and caustic alkali become uniformly distributed on the cellulose to form a uniform alkali cellulose. Good uniformity in the alkali cellulose is reflected in good uniformity and good solubility characteristics in the cellulose ethers prepared from the alkali cellulose.

The following examples set forth ways in which the principle of the invention has been practiced. It is to be understood, however, that the examples are purely illustrative and are not to be construed as a limitation of the invention.

EXAMPLE 1

Thirty parts by weight of purified air-dry wood pulp containing approximately 5% of moisture and cut sufficiently fine to pass through the openings in a standard 40-mesh sieve was added with agitation to a mixture of 566.4 parts by weight of isopropanol containing approximately 1.5% by weight of water and 65 parts by weight of additional water in a suitable container. The comminuted cellulose dispersed uniformly throughout the isopropanol-water mixture as individual particles of cellulose to form a slurry substantially free of felted or matted agglomerates of cellulosic particles. Thirty-one parts by weight of an aqueous solution containing 49.7% sodium hydroxide was added with agitation over a period of approximately 15 minutes and agitation was continued for approximately 1½ hours longer. During the addition of the aqueous caustic alkali solution and the subsequent period of agitation the individual particles of comminuted cellulose moved freely relative to each other through the slurry under the influence of agitation so that individual cellulosic particles were constantly contacting and rubbing against other cellulosic particles in the presence of the caustic alkali and the water, the caustic alkali and the water becoming uniformly distributed on the cellulose to form a uniform alkali cellulose in situ in the isopropanol slurrying medium. The entire procedure was conducted at a temperature within the range between about 18° C. and 25° C.

Taking into account the water in the cellulose and isopropanol as used, the system contained approximately 4.8% cellulose based on the combined weights of cellulose and isopropanol, both calculated on a moisture-free basis. On this same basis, the system contained 0.54 part sodium hydroxide per part of moisture-free cellulose, and 3.17 parts water per part of moisture-free cellulose, and the total amounts of water and sodium hydroxide present in the system corresponded to an aqueous sodium hydroxide solution of approximately 14.6% concentration.

The alkali cellulose in isopropanol formed in this example was etherified in the slurry to produce a water-soluble carboxymethylcellulose having approximately 0.7 carboxymethyl group per anhydroglucose unit in the cellulose without employing any additional caustic alkali or any additional water. The resulting cellulose ether exhibited unusually good solubility and uniformity, thus substantiating that an alkali cellulose of good uniformity was produced by this example employing only the required amount of caustic alkali and the required amount of water necessary for the subsequent preparation of the cellulose ether.

EXAMPLE 2

Sixty parts by weight of purified air-dry wood pulp containing approximately 5% by weight of moisture and cut sufficiently fine to pass through the openings in a standard 30-mesh sieve, 396 parts by weight of isopropanol containing approximately 1.5% by weight of water, and 52.5 parts by weight of additional water were mixed together with agitation in a suitable container to form a slurry of individual cellulosic particles substantially free of agglomerates. Sixty-two and five-tenths parts by weight of an aqueous solution containing 48.3% sodium hydroxide was then added with agitation over a period of about 15 minutes and agitation was continued for about 1½ hours longer. The entire procedure was conducted at a temperature within the range between about 18° C. and 25° C. On the same basis set forth in Example 1, the system contained approximately 12.7% cellulose calculated on a moisture-free basis, 0.53 part sodium hydroxide per part of moisture-free cellulose, and 1.64 parts water per part of moisture-free cellulose. The total amounts of water and sodium hydroxide present in the system corresponded to an aqueous sodium hydroxide solution of approximately 24.4% concentration.

The individual particles of comminuted cellulose moved freely relative to each other through the slurry under the influence of agitation so that individual cellulosic particles were constantly contacting and rubbing against other cellulosic particles in the presence of the caustic alkali and the water to effect a uniform distribution of caustic alkali and water on the cellulose. A highly uniform alkali cellulose was thus formed in situ in the isopropanol slurrying medium, and it was subsequently etherified in the slurry to produce a water-soluble carboxymethylcellulose having approximately 0.79 carboxymethyl group per anhydroglucose unit in the cellulose without employing any additional water or any additional caustic alkali.

EXAMPLE 3

Thirty parts by weight of purified air-dry wood pulp containing approximately 5% by weight of moisture and cut sufficiently fine to pass through the openings in a standard 40-mesh sieve, and 440 parts by weight of ethyl alcohol containing approximately 1% by weight of water were mixed together with agitation in a suitable container to form a slurry of individual cellulosic particles substantially free of agglomerates. Fifty-six and seven-tenths parts by weight of an aqueous solution containing 49.7% sodium hydroxide was then added with agitation over a period of about 15 minutes and agitation was continued for about 1½ hours longer. The entire procedure was conducted at a temperature within the range between about 18° C. and 25° C. On the same basis set forth in Example 1, the system contained approximately 6.1% cellulose calculated on a moisture-free basis, 0.99 part sodium hydroxide per part of moisture-free cellulose, and 1.22 parts water per part of moisture-free cellulose. The total amounts of water and sodium hydroxide present in the system corresponded to an aqueous sodium hydroxide solution of approximately 44.8% concentration.

The individual particles of comminuted cellulose moved freely relative to each other through the slurry under the influence of agitation so that individual cellulosic particles were constantly contacting and rubbing against other cellulosic particles in the presence of the caustic alkali and the water to effect a uniform distribution of caustic alkali and water on the cellulose. A highly uniform alkali cellulose was thus formed in situ in the ethyl alcohol slurrying medium, and it was subsequently etherified in the slurry to produce an alkali-soluble carboxymethylcellulose having approximately 0.12 carboxymethyl group per anhydroglucose unit in the cellulose without employing any additional caustic alkali or any additional water.

EXAMPLE 4

Following the procedure and experimental conditions set forth in Example 2, a highly uniform alkali cellulose was formed in situ in an isopropanol slurrying medium employing the following materials in the proportions set forth below:

40 parts by weight of purified cotton linters containing approximately 5% of moisture and cut sufficiently fine to pass through the openings in a standard 80-mesh sieve
487 parts by weight of isopropanol containing approximately 1.5% of water
58 parts by weight of additional water
41.7 parts by weight of an aqueous solution containing 48.3% sodium hydroxide On the same basis set forth in Example 1, the system contained approximately 7.3% cellulose calculated on a moisture-free basis, 0.53 part of sodium hydroxide per part of moisture-free cellulose, and 2.32 parts water per part of moisture-free cellulose. The total amounts of sodium hydroxide and water present in the system corresponded to an aqueous sodium hydroxide solution of approximately 18.6% concentration.

The alkali cellulose was subsequently etherified in the slurry to produce a water soluble carboxymethylcellulose of good uniformity and good solubility without employing any additional caustic alkali or any additional water.

EXAMPLE 5

Sixty parts by weight of purified air-dry wood pulp containing approximately 5% by weight of moisture and ground sufficiently fine to pass through the openings in a standard 200-mesh sieve, and 276 parts by weight of isopropanol containing approximately 1.5 parts of water were mixed together with agitation in a suitable container to form a slurry of individual cellulosic particles substantially free of agglomerates. Sixty and four-tenths parts by weight of an aqueous solution containing 49.7% sodium hydroxide and 19 parts by weight of additional water were then added with agitation over a period of about 15 minutes and agitation was continued for about 1½ hours longer. The entire procedure was conducted at a temperature between about 18° C. and 25° C. On the same basis set forth in Example 1, the system contained approximately 17.4% cellulose calculated on a moisture-free basis, 0.53 part sodium hydroxide per part of moisture-free cellulose, and 0.99 part of water per part of moisture-free cellulose. The total amounts of sodium hydroxide and water present in the system corresponded to an aqueous sodium hydroxide solution of approximately 34.8% concentration.

The individual particles of comminuted cellulose moved freely relative to each other through the slurry under the influence of agitation so that individual cellulosic particles were constantly contacting and rubbing against other cellulosic particles in the presence of the caustic alkali and the water to effect a uniform distribution of caustic alkali and water on the cellulose. A highly uniform alkali cellulose was thus formed in situ in the isopropanol slurrying medium, and it was subsequently etherified in the slurry to produce a water-soluble carboxymethyl-cellulose having good solubility and good uniformity without employing any additional caustic alkali or any additional water.

EXAMPLES 6-11

Following substantially the same procedure and experimental conditions set forth in Example 5, a series of runs was completed employing various slurrying media. Table 1 following lists these media, the proportions of the several materials employed, and the ratios and concentrations of these materials calculated on the same basis as that set forth in Example 1. In each instance a highly uniform alkali cellulose was formed in situ in the slurrying medium employing only the required amount of caustic alkali and the required amount of water necessary for the subsequent etherification reaction. In each instance the alkali cellulose was subsequently etherified in the slurry to produce a water-soluble carboxymethylcellulose having good solubility and good uniformity without employing any additional caustic alkali or any additional water.

*Table*

| Example No. | Slurrying Medium (Parts by Weight) | Cellulose [1] (Parts by Weight) | NaOH Solution 49.7% Concentration (Parts by Weight) | Additional Water (Parts by Weight) | Concentration of Cellulose in Slurry [2] (Percent by Weight) | Ratio NaOH to Cellulose [2] (Parts per Part) | Ratio Total Water to Cellulose [2] (Parts per Part) | Concentration [2] of NaOH (Percent by Weight) |
|---|---|---|---|---|---|---|---|---|
| 6 | Dioxane [3] 520 | 30 | 57 | 141 | 5.2 | 0.99 | 6.2 | 13.8 |
| 7 | n-Propanol [4] 520 | 30 | 57 | 84 | 5.2 | 0.99 | 4.0 | 19.9 |
| 8 | n-Butanol [4] 535 | 30 | 57 | 43 | 5.1 | 0.99 | 2.5 | 28.0 |
| 9 | Isobutanol [4] 535 | 30 | 57 | 43 | 5.1 | 0.99 | 2.5 | 28.0 |
| 10 | Tert-Butanol [4] 535 | 30 | 57 | 43 | 5.1 | 0.99 | 2.5 | 28.0 |
| 11 | Pentasol [4] (Mixture of amyl alcohols) 535 | 30 | 57 | 43 | 5.1 | 0.99 | 2.5 | 28.0 |

[1] Purified wood pulp containing approximately 5% water and cut to pass through openings in a standard 40-mesh sieve.
[2] Calculated on same basis as set forth in Example 1.
[3] Containing approximately 1% by weight of water.
[4] Substantially anhydrous.

Alkali celluloses prepared in accordance with this invention have been employed to prepare various alkali-soluble and water-soluble cellulose ethers in addition to carboxymethyl cellulose. Such ethers include by way of example various alkali-soluble and water-soluble hydroxyethyl cellulose, carboxyethyl cellulose, sulfoethyl cellulose, hydroxyethyl carboxymethyl cellulose, sulfoethyl hydroxyethyl cellulose, sulfoethyl carboxymethyl cellulose, cyanoethyl cellulose, and others.

In forming the slurry of comminuted cellulose in accordance with this invention it is immaterial whether the slurrying medium is added to the cellulose or whether the cellulose is added to the slurrying medium, since either method of operation results in the formation of a satisfactory slurry. Preferably the two should be mixed together with agitation to effect uniform distribution of the cellulose throughout the slurrying medium, and the slurries are sufficiently fluid so that mixing is readily accomplished with any ordinary mixing means, such as paddle stirrers, turbo mixers, and the like, or by tumbling in a suitable vessel.

It is important that the comminuted cellulose has a particle size sufficiently small to pass through the openings in a standard 35-mesh sieve or screen. Particles having this degree of comminution have the characteristic of distributing themselves readily throughout the slurry as individual particles when agitated without any tendency to mat or felt together into agglomerates. Moreover, the comminuted particles of cellulose in accordance with this invention move relative to each other through the slurry upon simple stirring or agitation. This is surprising and unexpected, for fibers larger than about 35 mesh do not possess these desirable characteristics, for there is a marked tendency for such larger fibers to felt and mat together into agglomerates, and the individual particles cannot move freely relative to each other through the slurry upon stirring or agitation. There does not appear to be any lower limit with respect to fineness, for material in the micron size range is entirely suitable. In fact, the smaller the individual particles are, the higher the percentage by weight of cellulose which can be slurried satisfactorily in the slurrying media of this invention, up to the working limit of about 20% by weight in accordance with this invention.

The comminuted cellulose may be derived from any suitable and well known source of cellulosic material, such as cotton, cotton linters, wood pulp, and the like. Comminution may be accomplished by any suitable comminution means, such as knife mills, hammer mills, ball mills, paper beaters, Jordan engines, attrition mills, and the like. Knife mills are preferred, however, over other means of comminution or attrition because knife mills tend to produce more uniform particles having clean-cut ends with a minimum amount of fibrillation, pinching or closing off of the ends of the comminuted particles, etc. Care must be exercised in comminuting the cellulose to avoid a harmful heat build-up which would tend to harm and degrade the cellulose. To this end it is advisable to provide adequate ventilation or other means of cooling the comminuting means.

The slurries of comminuted cellulose in accordance with this invention will contain up to about 20% by weight of cellulose, based on the combined weights of cellulose and slurrying medium, both calculated on a moisture-free basis. This has been found to be the practical upper working limit commensurate with ability to stir or agitate the slurry and readily obtain free movement of the individual cellulosic particles relative to each other through the slurry, this being an important feature of this invention. It is obvious, of course, that as little as 0.5% by weight or even less comminuted cellulose in the slurry is fully operable. However, amounts much less than about 4.5% by weight of cellulose are not economically attractive. Preferred percentages of comminuted cellulose are between about 4.5% and about 13% by weight, for this range of cellulosic concentration in the slurry combines optimum conditions of ready workability together with attractive economy of reagents.

The slurrying medium in accordance with this invention is selected from the group consisting of the aliphatic alcohols having from 2 to 5 carbon atoms in the molecule, dioxane, tetrahydrofuran, and mixtures thereof. Any of the aliphatic alcohols having from 2 to 5 carbon atoms in the molecule are suitable in accordance with this invention and include by way of example ethyl alcohol, normal propanol, isopropanol, normal butanol, secondary butyl alcohol, isobutyl alcohol, tertiary butyl alcohol, methyl propyl carbinol, diethyl carbinol, methyl isopropyl carbinol, tertiary amyl alcohol, fusel oil, pentasol, and the like. Preferred alcoholic media include isopropanol and tertiary butyl alcohol. It is a characteristic of these media that they all exhibit limited solubility for aqueous caustic alkali. It has already been emphasized hereinbefore that it is believed that this feature is an important attribute of these media, contributing materially to the attainment of a uniform alkali cellulose.

The slurrying media in accordance with this invention may be anhydrous or may contain various amounts of water, as desired. For instance, it is often more practical and convenient to employ an azeotropic mixture of an alcohol and water rather than the anhydrous medium. Likewise, it is often more practical to employ a recovered slurrying medium from a previous alkali-cellulose preparation directly without rectification. It is necessary, however, to know how much water is present in the slurrying medium in order to properly adjust the alkali cellulose system for required total water content.

The comminuted cellulose is contacted in the slurry with only the required amount of caustic alkali and the required amount of water necessary for the preparation of the desired cellulose ether. This is an important feature of this invention for in this way an optimum alkali cellulose is prepared which will permit maximum efficiency of utilization of the etherifying agent and thereby effect a great economy in reagents. It has been found in accordance with this invention that the optimum alkali-to-cellulose ratio for the most efficient preparation of any alkali-soluble or water-soluble cellulose ether must be within the range between about 0.2 part and about 1.8 parts for each part of cellulose, both being calculated on a moisture-free basis. Similarly, it has been found that the optimum water-to-cellulose ratio for the most efficient preparation of any alkali-soluble or water-soluble cellulose ether must be within the range between about 0.5 part and about 8.0 parts for each part of cellulose in a moisture-free state. It was discovered that when these optimum alkali-to-cellulose and water-to-cellulose ratios are attained, there is a suprisingly increased efficiency of conversion of reagents in the subsequent etherification reaction. In arriving at the water-to-cellulose ratio, the total water added must be taken into consideration; that is, all water present in the slurrying medium, moisture in the cellulose, and water added with the alkali must be totaled with free water added per se to the system in order to arrive at the water-to-cellulose ratio.

The order in which the several ingredients are brought together into contact with each other is immaterial. For example, part or all of the water and/or part or all of the alkali can be introduced into the slurrying medium prior to mixing with the comminuted cellulose. On the other hand, if desired, the comminuted cellulose can be mixed with the slurrying medium after which the water and alkali can be added, either separately in either order or together. If desired, part or all of the water can be mixed with the slurrying medium prior to mixing with the comminuted cellulose, after which the alkali and any additional water required can then be added either together or separately in either order. If desired, the water can be added to the cellulose prior to mixing with the slurrying medium, or may be distributed in any manner between the slurrying medium, the cellulose and the alkali. The alkali may be added as solid caustic or in aqueous solution. If added as solid caustic, sufficient additional time is required for the caustic to dissolve in the water present in the system. A preferred procedure comprises suspending a given weight of comminuted cellulose of known moisture content in a predetermined weight of slurrying medium of known moisture content with agitation, after which a predetermined weight of an aqueous caustic alkali solution of known concentration, together with any additional water required is added to the slurry with agitation over a period of about 10 to 20 minutes and agitation is continued for an additional ½ hour to 2 hours. It is apparent from the foregoing description that the important feature in accordance with this invention is contacting the comminuted cellulose in the slurry with only the required amount of alkali and the required amount of water, and that the order of bringing the several ingredients into contact is relatively immaterial.

The individual particles of comminuted cellulose are caused to move relative to each other through the slurry in the presence of the caustic alkali and the water. As set forth hereinbefore, this effects a uniform distribution of caustic alkali and water on the cellulose and forms in the medium a highly uniform alkali cellulose. In order to cause free movement of the cellulosic particles relative to each other through the slurry, and to effect uniform distribution of the caustic alkali and water on the cellulose requires agitation of the slurry throughout the process. This is readily accomplished by means of paddle stirrers, turbo mixers, and the like, or by tumbling in a suitable vessel.

It is desirable to maintain the temperature of the slurry at about room temperature or lower, for example, between about 10° C. and 30° C. throughout the process. This substantially eliminates harmful degradation of the alkali cellulose during preparation.

The process in accordance with this invention provides highly uniform alkali cellulose substantially free of harmful degradation which at the same time is of optimum composition with respect to both alkali content and water content for optimum efficiency and economy of reagents upon conversion to cellulose ether. It makes possible the preparation of alkali cellulose of predetermined controlled alkali content and water content employing only the required amount of alkali and the required amount of water necessary for the preparation of the desired cellulose ether. There are the added advantages of reduced recovery of slurrying diluent and increased production capacity because more concentrated slurries are made possible through the use of comminuted cellulose of fine particle size. The process provides alkali cellulose in a highly desirable form and of a composition particularly suitable for preparation of alkali-soluble and water-soluble cellulose ethers of greatly improved uniformity and solubility characteristics as compared to the products of prior art processes.

What we claim and desire to protect by Letters Patent is:

1. A process for preparing an alkali cellulose to contain a required proportion of cellulose, caustic alkali and water which comprises forming a slurry of comminuted cellulose in a medium of the group consisting of the aliphatic alcohols having from 2 to 5 carbon atoms in the molecule, dioxane, tetrahydrofuran, and mixtures thereof, said slurry containing up to about 20 per cent of said comminuted cellulose based on the combined weights of said medium and said cellulose, said comminuted cellulose having a particle size sufficiently small to pass through the openings in a 35-mesh sieve and being distributed throughout said slurry as individual particles substantially free of agglomerates, contacting the comminuted cellulose in the slurry with only the required amount of caustic alkali and the required amount of water, said caustic alkali being within the range between about 0.2 part and about 1.8 parts, calculated on a moisture-free basis, and said water being within the range between about 0.5 part and about 8.0 parts for each part of moisture-free cellulose by weight, and causing the individual particles of cellulose to move relative to each other through the slurry and to contact each other and rub together in the presence of the caustic alkali and the water to effect a uniform distribution of the caustic alkali and the water on the cellulose to produce a slurry of alkali cellulose in the slurrying medium.

2. A process for preparing an alkali cellulose to contain a required proportion of cellulose, caustic alkali and water which comprises forming a slurry of comminuted cellulose in a medium of the group consisting of the aliphatic alcohols having from 2 to 5 carbon atoms in the molecule, dioxane, tetrahydrofuran, and mixtures thereof, said slurry containing between about 4.5 and about 13 per cent of said comminuted cellulose based on the combined weights of said medium and said cellulose, said comminuted cellulose having a particle size sufficiently small to pass through the openings in a 35-mesh sieve and being distributed throughout said slurry as individual particles substantially free of agglomerates, contacting the comminuted cellulose in the slurry with an amount of aqueous caustic alkali solution sufficient to contain only the required amount of caustic alkali and the required amount of water, said caustic alkali being within the range between about 0.2 part and about 1.8 parts, calculated on a moisture-free basis, and said water being within the range between about 0.5 part and about 8.0 parts for each part of moisture-free cellulose by weight, and causing the individual particles of cellulose to move relative to each other through the slurry and to contact each other and rub together in the presence of the aqueous caustic alkali solution to effect a uniform distribution of caustic alkali and water on the cellulose to produce a slurry of alkali cellulose in the slurrying medium.

3. Process in acordance with claim 2 in which the slurrying medium is isopropanol.

4. Process in accordance with claim 2 in which the slurrying medium is tertiary butyl alcohol.

5. Process in accordance with claim 2 in which the slurrying medium is dioxane.

6. Process in accordance with claim 2 in which the slurrying medium is secondary butanol.

7. Process in accordance with claim 2 in which the slurrying medium is tertiary amyl alcohol.

References Cited in the file of this patent

UNITED STATES PATENTS

| Number | Name | Date |
|---|---|---|
| 1,960,551 | Richter | May 29, 1934 |
| 2,079,313 | Clary et al. | May 4, 1937 |
| 2,236,533 | Hahn | Apr. 1, 1941 |
| 2,447,914 | Ruperti | Aug. 24, 1948 |
| 2,517,577 | Klug et al. | Aug. 8, 1950 |
| 2,539,417 | Grassie | Jan. 30, 1951 |
| 2,542,215 | Smith | Feb. 20, 1951 |
| 2,548,455 | Walker et al. | Apr. 10, 1951 |
| 2,572,039 | Klug | Oct. 23, 1951 |
| 2,580,351 | Grassie | Dec. 25, 1951 |
| 2,580,352 | Grassie | Dec. 25, 1951 |

FOREIGN PATENTS

| Number | Country | Date |
|---|---|---|
| 543,301 | Great Britain | Feb. 18, 1942 |
| 637,134 | Great Britain | May 10, 1950 |